R. M. WIDNEY.
TRANSPLANTER.
No. 177,444. Patented May 16, 1876.
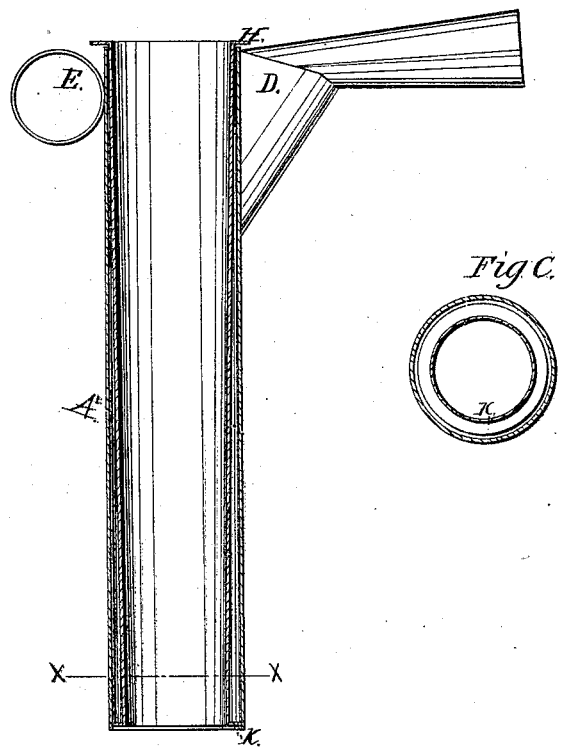
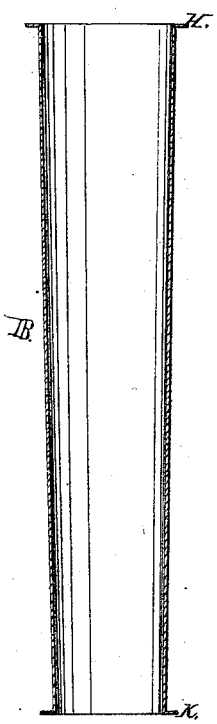
Attest:
Charles B. Wright
C. H. Grattan
Inventor:
R. M. Widney

UNITED STATES PATENT OFFICE.

ROBERT M. WIDNEY, OF LOS ANGELES, CALIFORNIA.

IMPROVEMENT IN TRANSPLANTERS.

Specification forming part of Letters Patent No. 177,444, dated May 16, 1876; application filed May 25, 1875.

*To all whom it may concern:*

Be it known that I, ROBERT MACLAY WIDNEY, of Los Angeles, California, have invented a Transplanter, of which the following is a specification:

The instrument or invention is to be used in transplanting small trees, shrubs, flowers, or plants of any kind, while small.

Figure A is a vertical section of my improvement or invention. Fig. B is a vertical section of the inside cylinder. Fig. C is a cross-section on the lines *x x* of Fig. A.

The invention, as a whole, consists of an outside and an inside cylinder — in length from six inches to one, two, or three feet, and of any desired diameter—the outside cylinder having a handle and ring on one end, the inside cylinder having a flange on each end. (See Fig. A.)

The outside cylinder is a true cylinder, having a handle, D, riveted and soldered on, as shown in Fig. A, also having a flat ring soldered on opposite the handle E. This cylinder may be made of galvanized iron or steel, or may have only a steel rim at the bottom.

The inside cylinder has a flange on the upper end larger than the outside cylinder H. It has also a flange on the lower end, that will pass inside the outer cylinder K.

The instrument is operated by placing the lower end on the ground, where it is desired to set out the plant. By pressing down on the handle D the outer cylinder A' is forced down into the ground. The lower flange of the inside cylinder, resting on the surface of the ground, causes the inside cylinder to remain stationary. Lifting the instrument up, a plug of earth remains in the cylinder. By pressing down on the inside cylinder the plug of earth is discharged from the cylinder.

The instrument is next placed over the plant, so that the leaves and stalk are inside the inner cylinder. By pressing down on the handle, as before, a plug of earth containing the roots is cut out. The instrument, containing the plant and plug of earth, is then to be set down in the first hole cut out, and by pressing upon the handle and ring of the outer cylinder, and holding the inner cylinder stationary, the plug of earth containing the roots is left in the desired place. The roots are thus left undisturbed, and the earth around the hole is left firm. In gravelly soil the outer cylinder should be of steel, or should have a steel shoe or edge on the lower end. The size of the instrument is to be adapted to the size of the plants.

What I claim as my invention, and desire to secure by Letters Patent, is—

The combination of the outer cylinder A', of equal diameter throughout its whole length, and provided with suitable handles E D of the inner cylinder B, having an exterior rim, K, that fits the inner surface of the outer cylinder, and having the upper end of equal external diameter with the inner diameter of outer cylinder, and provided with an exterior flange, H, of sufficient size to cover the upper end of the outer cylinder.

R. M. WIDNEY.

Witnesses:
C. H. GRATTAN,
J. W. LILLETTE.